Dec. 4, 1956  F. A. GASTRIGHT  2,772,890
MAIL SACK CARRIER CART
Filed May 26, 1954  5 Sheets-Sheet 1

INVENTOR.
Frank A. Gastright
BY
ATTORNEY.

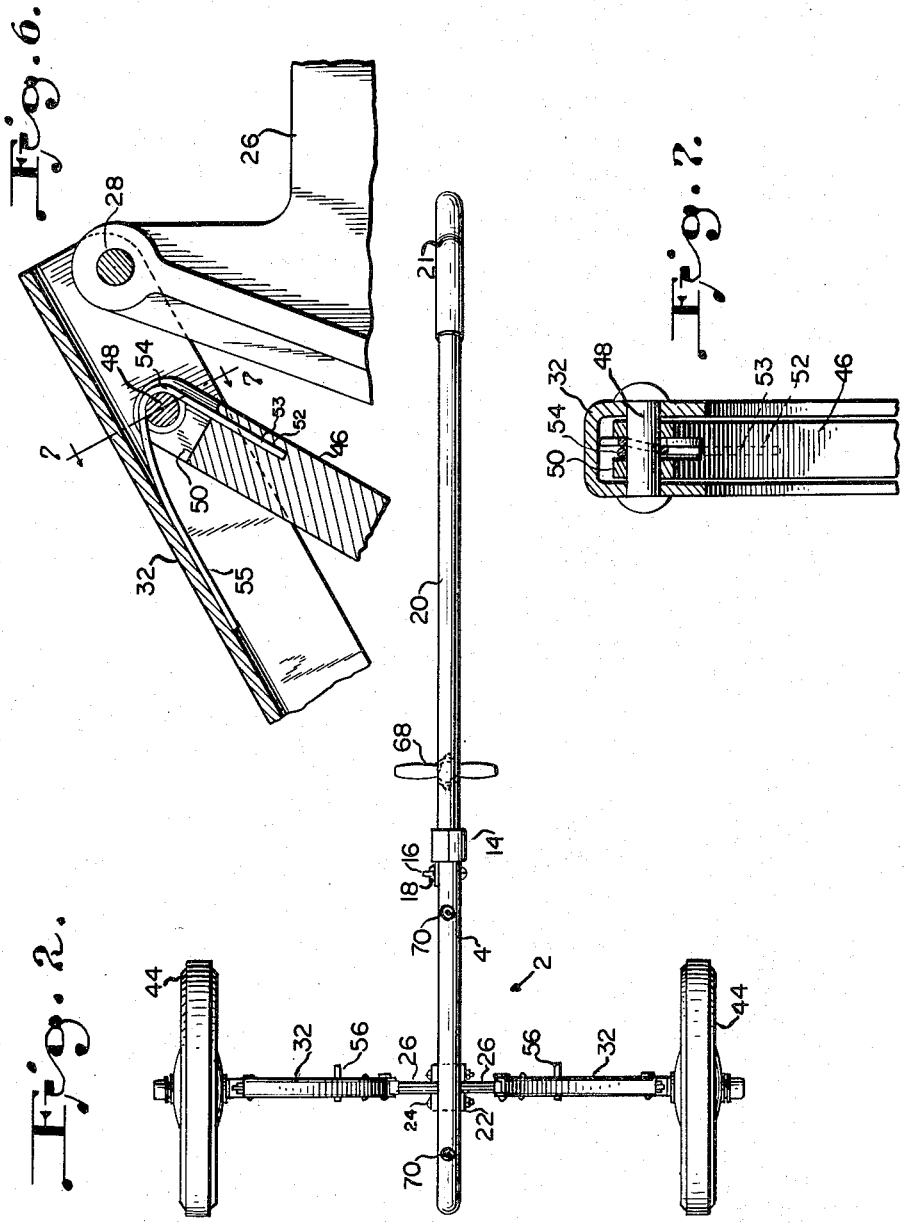

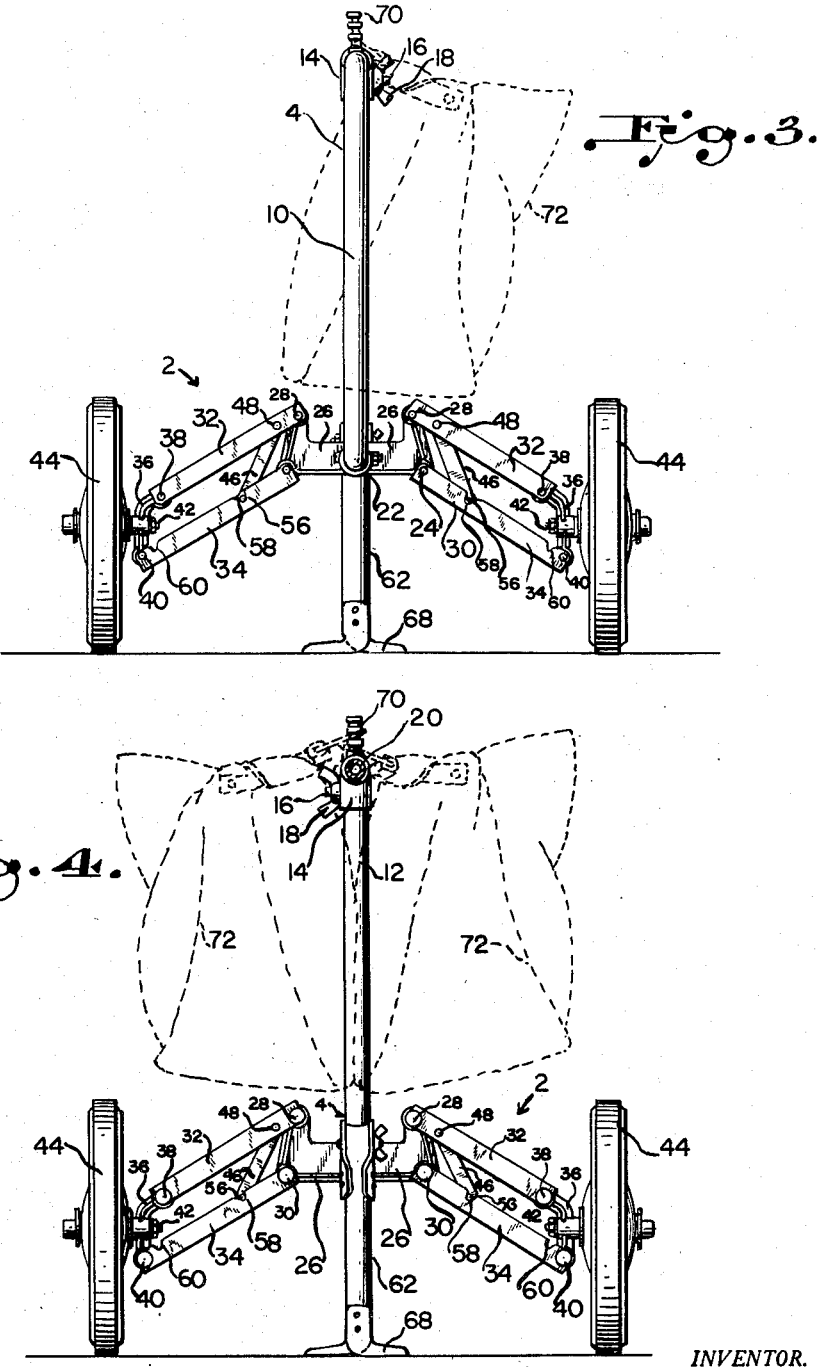

INVENTOR.
Frank A. Gastright
ATTORNEY.

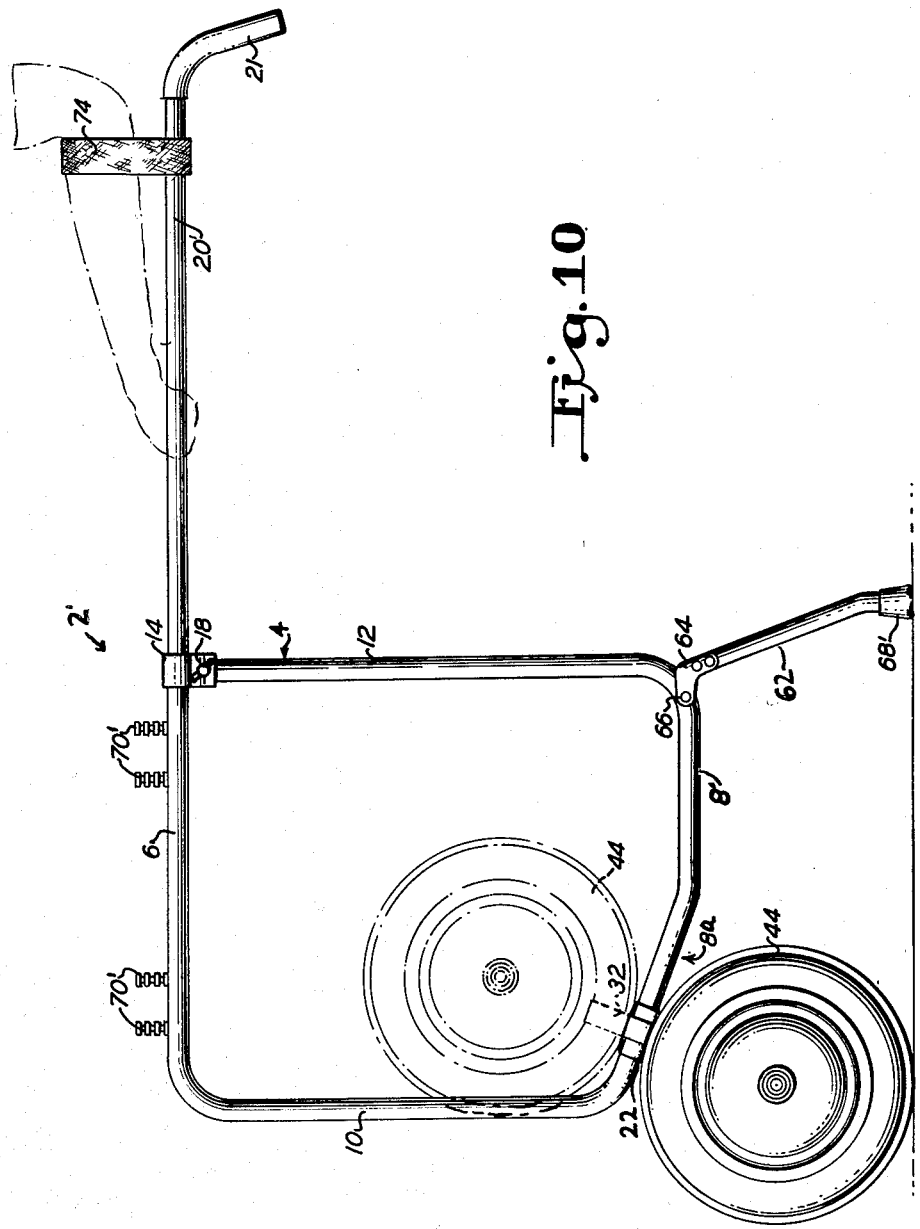

2,772,890

MAIL SACK CARRIER CART

Frank A. Gastright, Fort Lauderdale, Fla., assignor, by mesne assignments, to Morris Weintraub, Newport, Ky.

Application May 26, 1954, Serial No. 432,555

4 Claims. (Cl. 280—40)

This invention relates to two wheeled carts and, more particularly, to a cart for carrying one or more mail sacks of the type used by letter carriers.

The object of the present invention is to provide assistance for the letter carrier in the course of his appointed rounds, and the invention particularly is intended for use in residential areas where, on certain days and seasons, the burdens imposed by issues of magazines, catalogs and advertising matter have become well nigh unbearable. The invention is prescribed to meet certain peculiar conditions heretofore unsatisfied by the prior art. One of these conditions is that the cart, in normal operative condition, should be relatively long and high so as to be comfortably manipulated and to provide access to the mail sacks without stooping. The wheeled suspension must be well above the ground to permit travel over rough terrain and rolling over curbs. It is intended also that the cart be stable so it can be rested on the ground without danger of tumbling over. While meeting these and other operating requirements, it is intended that the cart be collapsible so as to fit in a mail or relay box so that the postman need not return the cart to the post office or take it home with him. Another condition which the invention is intended to meet is that the cart must be extremely light, and that it be collapsible with one or two mail sacks attached so that, if necessary, it and the sacks can easily be carried on a streetcar or bus. Another object is that, when collapsed, the cart may be rested on the ground in an upright position without likelihood of toppling sideways.

A further and most important object of the invention is to provide a cart capable of carrying relatively heavy loads in mail sacks hung thereon, and wherein the load weight is suspended directly over the axis of the two wheels when the rear of the cart is tipped upwardly from its position of rest to the position of use so that no appreciable weight is imposed on the rearwardly extending handle with which the letter carrier pushes or pulls the cart. It is further intended that the cart be balanced laterally, no matter whether there be one sack or two sacks hung thereon, the arrangement being that one sack will strike its own balance by hanging suspension in the open frame, and when two sacks are hung, one on each side of the cart, the loads will offset one another laterally.

Another object is to provide a retractable wheel mounting linkage operating as deformable parallelograms whereby the wheels may be extended outwardly on opposite sides of the cart or retracted upwardly and inwardly so as to lie alongside the mid portion of the cart. It is further intended to provide spring biased latching links for releasably holding the deformable parallelogram linkages in either extended or retracted position.

Other objects include the provision of a letter carrier's cart of penurious simplicity, easy to mass produce, and utilizing the bare essentials of mechanical parts.

These and other objects will be apparent from the following specification and drawings, in which:

Fig. 2 is a plan view of the cart;

Fig. 3 is a front elevation of the cart in position of rest with one mail sack hung thereon;

Fig. 4 is a rear elevation partly in section along the line 4—4 of Fig. 1 of the cart in position of rest with two mail sacks shown in dash lines;

Fig. 6 is an enlarged fragmentary view partly in section, showing the detail of the spring and pivotal mounting of the latch link;

Fig. 7 is a cross section along the line 7—7 of Fig. 6;

Fig. 10 is a side elevation of a modification of the cart shown in Figs. 1 to 9 inclusive.

Figure 5:
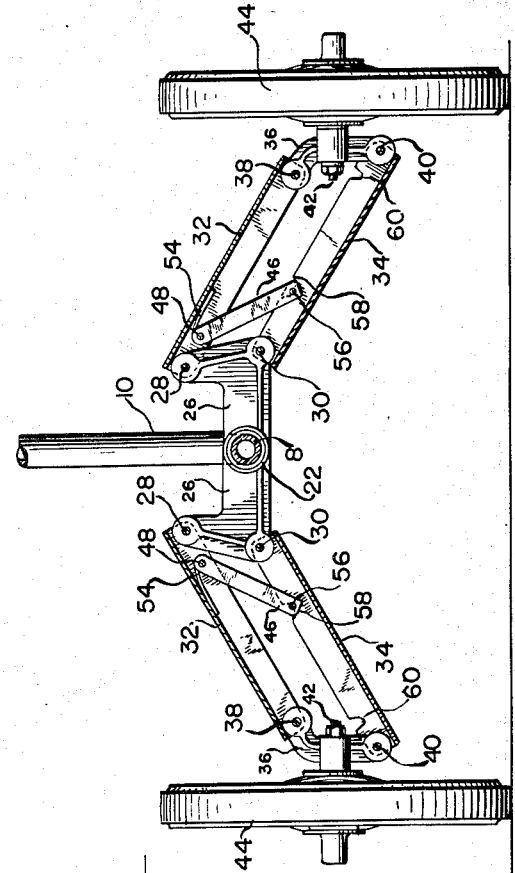
Fig. 5 is an enlarged view showing the wheel supporting linkage in extended position.

Referring now to the drawings in which like reference numerals denote similar elements the cart 2 has rectangular frame 4 formed preferably of aluminum pipe bent to provide top and bottom bars 6 and 8 and front and rear bars 10 and 12 respectively. The frame is of closed configuration with the ends of the pipe from which it is formed joined by a split-T coupling 14 drilled through to receive a bolt 16 having a winged clamping nut 18. An elongate handle 20 also formed of aluminum pipe has its forward end removably engageable in the T-coupling 14 and removably held by tightening down winged clamp nut 18. The downwardly bent rear end of handle 20 is preferably covered with a tubular grip 21.

Figure 9:
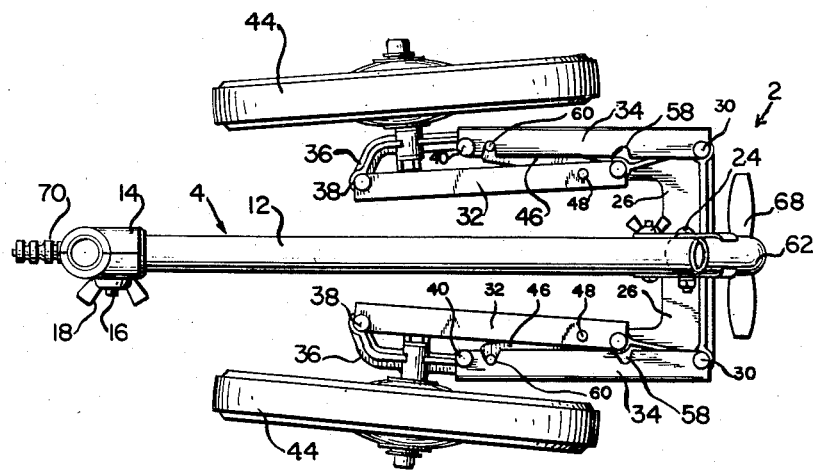
Fig. 9 is a top plan view of the folded cart in the Fig. 8 position.

Forward of the middle of bottom bar 8 of the frame is a collar 22 rigidly secured around the bottom bar by bolts 24. Collar 22 has projecting laterally on each side upwardly hooking shoulders 26, each of which mounts upper and lower spaced pivots 28 and 30 respectively. U-channel links 32 and 34 pivotally support the inner ends by upper and lower spaced pivots 28 and 30 respectively, and are held parallel at their outer ends by bent arms 36 having upper and lower spaced pivots 38 and 40 to which the upper and lower links 32 and 34 are respectively pivoted. Axles 42 are affixed in apertures through bent arms 36 for mounting wheels 44. It will be apparent by comparing Fig. 5 with Fig. 9 that a deformable parallelogram linkage is provided for supporting wheels 44 on frame 4 forwardly of the fore-and-aft mid point of the frame, and that the wheels normally extend downwardly and outwardly to ground engaging position but are retractable upwardly and inwardly of the frame to retracted position. A diagonal latch link 46 is provided for selectively retaining the wheel supporting linkage in extended or retracted condition. As detailed in Figs. 6 and 7, latch link 46 has one end pivoted at 48 within the upper U-channel link 32. Adjacent pivot 48 latch link is forked as indicated at 50 and drilled to provide a socket 52 for anchoring one end 53 of a coil spring 54. The coil spring wraps around pivot 48 and its free end 55 abuts against U-channel link 32 so that the free end of latch link 46 is normally biased towards the lower U-channel link 34. A cross pin 56 on the free end of the latch link is selectively engageable in one or the other of notches 58 or 60, depending on whether the wheel suporting linkage be extended or retracted. The edges of notches 58 and 60 constitute abutments for the free end of latch link 46.

Pivoted to the lower rear corner of rectangular frame 4 is a retractable leg 62, the pivotal connection including brackets 64 riveted to the upper end of leg 62 and connected to the frame by a pivot bolt 66. Leg 62 has riveted to its lower end a pair of feet 68 for support on soft ground.

Figure 1:
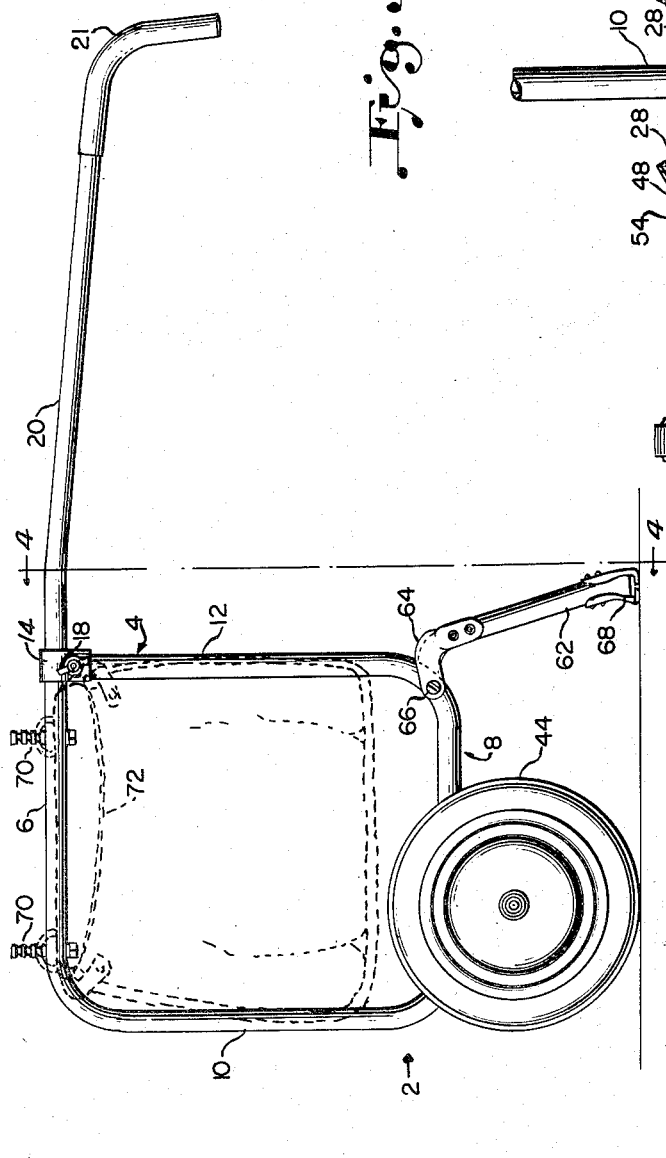
Fig. 1 is a side elevation showing the cart in position of rest with a mail sack thereon shown in dash lines.

Projecting upwardly from the top frame bar 6 are a pair of pegs 70 adapted for supporting one or two mail sacks 72. As illustrated by dash lines in Fig. 3, when one mail sack is hung on the pegs, the body of the sack will, if it be loaded, swing to a position of self-balance within frame 4, whereas if two mail sacks are hung on pegs 70, they will abut and offset the weight of one another. Obviously if two mail sacks, one loaded and the other light, are hung on pegs 70, a balance will be struck so that the combined weight is in the plane of rectangular frame 4. Thus, the hanging load on pegs 70, be it one sack or two, is always laterally centered in the plane of the frame. The term "sack" as used herein is the term used by the letter carriers to define the leather receptacle usually carried on the person by a sling strap over one shoulder. Fig. 1 illustrates the cart in position of rest on the ground. When it is trundled about, the rear end of handle 20 is manually raised so as to tip the car forwardly from the Fig. 1 position, thereby placing the weight of the sack 72 directly over the axis of wheels 44.

When cart 2 is used on level ground, the letter carrier loosely grasps handle grip 21 which is dimensioned so that the bend of the grip, in the position of rest illustrated in Fig. 1 is just below the downwardly hanging hand position for a person of normal height. By reaching downwardly some two or three inches, the letter carrier grasps the handle and lifts it upwardly to a position in which his hand falls when his arm hangs relaxed downwardly. This action tilts the cart slightly forwardly from the Fig. 1 position and places the weight of mail sack or sacks 72 substantially over the mid point of the wheel axis, and the cart may be pushed or pulled without necessitating retraction of ground engaging posts 62. Over rough terrain the cart is generally pulled and if post 62 strikes an obstacle it will move freely towards its retracted position and thereby avoid blocking of the cart. As hereinbefore detailed the sack load is laterally centered substantially in the plane of the frame so that balance in the fore-and-aft axis and transverse axis is maintained. Since the front and rear edges of a mail sack substantially coincide with the front and rear frame bars 10 and 12, a loaded sack may be slightly jammed between the front and rear frame bars to prevent any appreciable swinging from side to side.

Figure 8:
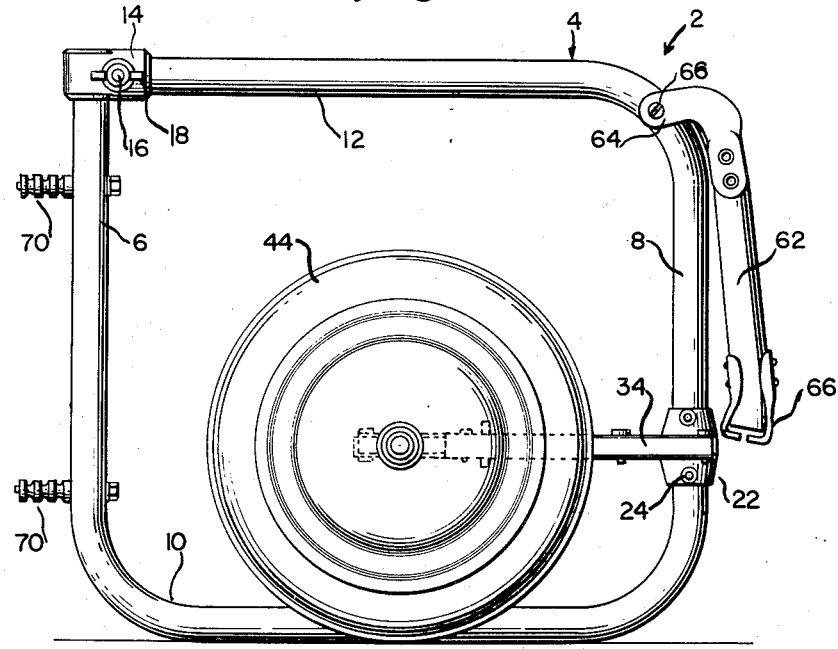
Fig. 8 is a side elevation showing the cart with handle removed, wheels and supporting posts retracted and in position of rest on the ground.

When cart 2 is to be stored in a mail or relay box, handle 20 is removed by loosening wing clamp nut 18, post 62 is swung forwardly against the underside of bottom frame bar 8, cross pins 56 are manually engaged and lifted out of notches 58 and frame 2 is pressed downwardly, thereby swinging links outwardly and upwardly. By grasping wheels 44 they and their supporting linkage are then swung to the position shown in Figs. 8 and 9 whereupon cross pins 56 in latch links 46 snap into slots 60, so as to lock the linkage in retracted position. The cart may then be tipped 90° forwardly to the Fig. 8 position and stabilized by wheels 44 when front frame bar 10 is rested on the ground. When the wheels are retracted, sufficient space between the wheel supporting linkage is maintained so that an empty mail sack may, if desired, be left within the frame. If the cart is to be transported in a public conveyance it may be easily carried by grasping rear frame bar 12 and in most instances is unnecessary to remove handle 20 since the latter will merely extend upwardly alongside the individual carrying the otherwise folded cart.

The cart 2' illustrated in Fig. 10 is generally similar to that shown in Figs. 1 to 9 inclusive in that the frame 4' has a straight top bar 6' and straight vertical front and rear bars 10 and 12, and the rear bar is connected at its upper end to top bar 6 by a split-T coupling 14 tightened by a wing nut 18 as in the previously described embodiment. However, handle 20' extends straight rearwardly and is provided with a sling strap 74 for receiving the forearm of the cart operator so that the cart may be propelled by grip 21, manual engagement of handle 20, with the forearm engaged through sling strap 74, or if the mailman wishes to have his hand free for sorting mail, the cart may be pushed or pulled entirely by forearm engagement. Four pins 70' are provided on top bar 6' so that mail sacks may be shifted backwardly and forwardly to balance weight as desired. Additionally, leg 62 has on its lower end a crutch tip 68' instead of the feet 68 used in the first embodiment.

The modification shown in Fig. 10 has wheels 44 supported on the same retractable linkage as in the embodiment previously described, link 32 being shown in dotted lines to denote its retracted position. However, lower bar 8' of frame 4' is formed with a diagonal bend 8a, approximately a 20° angle to top bar 6, at its forward end. The retractable wheel linkage, being mounted by collar 2—2 on the diagonal bend 8a of bar 8' is at right angles to the direction of the load when the rear end of cart 2' is tipped forwardly, approximately 20°, to the normal wheeling position. It will be understood that the angular disposition of bent portion 8a may be varied somewhat, so long as it lies generally horizontal when the cart is tipped forwardly by lifting handle 20' for wheeling along the ground. In addition, the modified arrangement eliminates the critical point of balance sometimes encountered in the first embodiment. In all other respects, both forms of the invention are similar in operation.

The invention is not limited to the details of the structure described and illustrated, but is intended to cover all substitutions, modifications and equivalents within the scope of the following claims.

I claim:

1. A foldable cart adapted normally to be rolled along the ground for transporting a mail sack of the type utilized by letter carriers, and being foldable to fit within a mail or relay box, comprising a frame having spaced upper and lower bars extending lengthwise of the direction of cart movement and spaced front and rear bars respectively joined to the upper and lower bars, a pair of wheels, deformable parallelogram linkage retractably mounting said wheels on the lower bar for swinging between an extended position in which said wheels extend downwardly and outwardly from the lower bar and a retracted position in which said wheels are disposed upwardly from the lower bar and inwardly alongside said frame, a handle, means for removably attaching said handle to the frame adjacent the juncture of the upper and rear bars, a retractable ground-engaging post pivoted to said frame adjacent the juncture of the lower and rear bars, said post being pivoted between an extended position in which it extends downwardly from the frame and a retracted position in which it lies alongside the frame, and a pair of spaced pegs extending upwardly from the top bar for hangingly supporting an upper portion of a mail sack whereby the body of the sack hangs downwardly alongside the frame.

2. Deformable parallelogram linkage for supporting a wheel on a cart frame, comprising a pair of elongate U-channel members, means including spaced pivots for supporting inner ends of said members on said frame, means including spaced pivots connected to outer ends of said members for supporting said wheels thereon, and means for selectively locking said linkages in extended and retracted positions including a link extending diagonally between said members, means pivotally mounting said link to the flanges of one of said members, spring means engaged between said link and said one member and biasing the other end of the link towards the other member, the other member having spaced abutments thereon, and means on the other end of said link for engaging either of said abutments, whereby to lock said linkage in said respective positions.

3. Deformable parallelogram linkage for supporting a wheel on a cart frame, comprising a pair of oppositely disposed, parallel, elongate U-channel members having the flanges on one member facing the flanges on the other, spaced pivot means for supporting corresponding ends of said members on said frame, similarly spaced pivot means for supporting the wheel on opposite corresponding ends of the members, a locking link diagonally disposed between said members with the ends of the locking link respectively disposed between the flanges on said members, a pivot pin extending between the flanges of one of said members and pivotally supporting one end of said locking link therein, a spring engaged between said one end of said locking link and the member to which the same is pivoted for biasing the other end of the locking link towards the other member, a latch pin affixed to the other end of said diagonal locking link, the flanges of the other member having notches spaced along the length thereof for receiving said locking pin.

4. A cart adapted to be rolled along the ground for transporting a mail sack of the type used by letter carriers, comprising; a frame of closed configuration having spaced generally vertical front and rear bars, top and bottom bars respectively connecting the upper and lower ends of said front and rear bars, means on the top bar for supporting on upper portion of a mail sack whereby said sack hangs downwardly alongside said frame, a pair of wheels, pivoted linkage retractably mounting said wheels on opposite sides of the forward portion of said lower bar, said linkage being swingable between an extended position in which said wheels are disposed downwardly and outwardly from the lower bar and a retracted position in which said wheels are disposed upwardly of the lower bar and alongside the confines of said frame, a ground engaging member on said frame adjacent the lower end of the rear bar for resting said frame on the ground in a position in which said top bar lies generally horizontal, a handle on the rear end of the frame whereby the same may be tipped forwardly for wheeling along the ground, said linkage being swingable in a plane at right angles to the bar portion on which it mounts the wheels, said bar portion being disposed at an angle of approximately 20° to the top bar so that said forward portion of said lower bar lies generally horizontally when said cart is tipped up by said handle and whereby the plane of pivotal swinging of said linkage is substantially vertical when said cart is so wheeled.

References Cited in the file of this patent

UNITED STATES PATENTS

| D. 170,636 | Gastright | Oct. 20, 1953 |
| 208,172 | Harper | Sept. 17, 1878 |
| 362,868 | Roberts | May 10, 1887 |
| 634,799 | Bower | Oct. 10, 1899 |
| 2,326,482 | Moffitt | Aug. 10, 1943 |
| 2,502,579 | McKibben | Apr. 4, 1950 |
| 2,523,893 | Williamson | Sept. 26, 1950 |

FOREIGN PATENTS

| 578,782 | Great Britain | July 11, 1946 |